(12) United States Patent
Madathilparambil George et al.

(10) Patent No.: US 7,523,281 B2
(45) Date of Patent: *Apr. 21, 2009

(54) AUTHENTICATING HARDWARE FOR MANUALLY ENABLING AND DISABLING READ AND WRITE PROTECTION TO PARTS OF A STORAGE DISK OR DISKS FOR USERS

(76) Inventors: George Madathilparambil George, 405D, Purva Park, Jeevanahalli Road, MSO Colony, Cox Town P.O., Bangalore (IN) 560005; Nikhil George, 405D, Purva Park, Jeevanahalli Road, MSO Colony, Cox Town P.O., Bangalore (IN) 560005

( * ) Notice: Subject to any disclaimer, the term of this patent is extended or adjusted under 35 U.S.C. 154(b) by 256 days.

This patent is subject to a terminal disclaimer.

(21) Appl. No.: 11/515,619

(22) Filed: Sep. 6, 2006

(65) Prior Publication Data

US 2008/0059742 A1    Mar. 6, 2008

(51) Int. Cl.
*G06F 12/00*    (2006.01)
*G06F 13/00*    (2006.01)
*G06F 13/28*    (2006.01)
*G06F 11/30*    (2006.01)
*G06F 12/14*    (2006.01)
*H04L 9/32*    (2006.01)

(52) U.S. Cl. ................ 711/163; 711/154; 711/164; 713/193

(58) Field of Classification Search ............ 711/163
See application file for complete search history.

(56) References Cited

U.S. PATENT DOCUMENTS

| 5,657,445 | A  | * | 8/1997  | Pearce .................... 726/23 |
| 6,330,648 | B1 | * | 12/2001 | Wambach et al. ........... 711/163 |
| 6,643,757 | B2 | * | 11/2003 | Fontijn .................. 711/202 |
| 7,107,460 | B2 | * | 9/2006  | Cromer et al. ............ 713/193 |
| 2002/0078295 | A1 | * | 6/2002 | Shaath et al. ............ 711/112 |
| 2006/0117156 | A1 | * | 6/2006 | Chai et al. .............. 711/163 |
| 2007/0055837 | A1 | * | 3/2007 | Rajagopal et al. ......... 711/163 |

* cited by examiner

*Primary Examiner*—Brian R Peugh
*Assistant Examiner*—Ryan Bertram

(57) ABSTRACT

Data protection is weak with the methods currently available and there are risks of corrupting important data, including system data accidentally by users or by malicious programs. We are proposing a method for improving access protection, more particularly, protection for data on mass memories by adding a hardware that will enable or disable read or write protection to portions of mass memories for each user. The hardware supports one or more users and two or more states for each supported user. The state of the hardware is manually controlled by the users. Depending on the configuration, each hardware state corresponding to a user corresponds to disabling or enabling read or write protection to some portions of a mass memory or mass memories for that user.

30 Claims, 5 Drawing Sheets

AUTHENTICATING HARDWARE FOR MANUALLY ENABLING AND DISABLING READ AND WRITE PROTECTION TO PARTS OF A STORAGE DISK OR DISKS FOR USERS

BACKGROUND OF THE INVENTION

The present invention relates to controlling access for users to portions of mass memories such as hard disks, storage arrays, JBODs (Just a Bunch of Disks), RAID storage or future technologies for mass memories. We also use the word storage to refer to mass memories in this invention.

Current technologies provide protection at the file system level and a malicious program or user can get access as a privileged user and read confidential user data or corrupt user data. It requires hardware support to gain complete protection from malicious programs. Prior art technologies allow either full access or one level of hardware controlled restricted access. This level of hardware support is not sufficient to protect all users. It is possible for privileged users to corrupt data unintentionally by installing a malicious program or by manual error during full access.

We refer to the software, firmware and hardware components that control access to mass memories as storage components. The storage components are file systems, volume managers, storage stack, interface drivers, Host Bus Adapters, disk controllers, etc. File systems create a logical view of data in the form of files and directories. Some systems contain volume managers which present logical disks to its upper layer modules such as file systems. The storage stack provides access to physical disks for file systems, volume managers and users who do read or write directly to disks (raw access). Interface drivers control Host Bus Adapters (HBAs) and provide an interface for the storage stack to issue storage commands and transfer data from and to the storage. On systems that do not have a storage stack, file systems interact directly with interface drivers. The Host Bus Adapters are connected to storage array controllers or disk controllers through an interconnect mechanism such as SCSI, SAS, SATA, FC, IDE, etc. A firmware on a disk controller or the disk controller hardware controls operations on the disk in response to commands received from Host Bus Adapters. A firmware on the storage array controller or the storage array controller hardware controls operations on the array in response to commands received from Host Bus Adapters.

There are different methods for access control such as non-privileged users in UNIX or Windows operating systems who cannot access all parts of mass memories (storage). But a malicious program or user can sometimes exploit security weaknesses in an operating system, to get access as a privileged user. This will allow malicious users to gain access to critical data belonging to other users or corrupt users' data.

There is serious risk to users' data when their laptops are stolen or when someone gains access to a user's computer in the user's absence.

There is serious risk to users' data when a privileged user is malicious.

There are many methods for protecting user memories which do not require manual action for enabling and disabling protection; Such protections can be compromised by malicious programs by emulating the required software behavior.

U.S. Pat. No. 6,330,648 illustrates a method of adding protection against malicious programs using a manually controlled hardware with two states. By default the protection is enabled and has a mechanism to manually switch off the protection. This invention will not be able to provide protection for portions of storage belonging to each user, as is possible using our invention. Another drawback of the invention is that the solution cannot be used with mass memories which are already manufactured.

US Patent application 20060117156 illustrates a method of adding protection for non-volatile memories against malicious programs using a manually controlled hardware with two or more states, but only two states used for protection. One state has protection enabled and other state has protection disabled. This invention will not be able to provide protection for portions of storage belonging to each user, as is possible using our invention.

FIG. 1 shows an example of storage components that allow a process in a computer to connect to mass memories such as hard disks, storage arrays, etc. The computer 101 has an internal disk 102. The computer 101 is connected to an external disk 103, a storage array 104 and a JBOD (Just a Bunch Of Disks) 105. The user processes running on the computer interact with File System 106, Volume Manager 107, or the storage stack 108. File systems 106 interact with Volume Managers 107 and Storage Stack 108. The Volume Manager 107 interacts with Storage Stack 108. The storage stack sends disk read or disk write requests to Host Bus Adapter (HBA) through Interface Drivers 109, 110. The Interface Drivers control Host Bus Adapters (HBAs) 111, 112, 113, 114. The HBAs are connected to disk or array controllers through storage interconnects such as SCSI bus, SAS, SATA or Fibre-Channel network. In this example, HBA#1 111 is connected to Disk Controller 115, HBA#2 112 is connected to Disk Controller 116, HBA#3 113 is connected to Array Controller 117 and HBA#4 114 is connected to Disk Controller 118 in the JBOD 105.

Disk controllers control operations of the disk or disks connected to them. Disk firmware controls operations of disk controllers. Array controllers controls operations of disk controllers in arrays. Array controller firmware control operations of array controllers.

A computer may have one or more file systems. Some computers do not contain volume managers. Some computers may contain one or more volume managers. Some computers do not contain a storage stack.

BRIEF SUMMARY OF THE INVENTION

Mass memories include hard disk drives, storage arrays, JBODs, RAID storage, etc. It is the object of the present invention to use an authenticating hardware which supports one or more users and supports two or more states for each user to control access to portions of mass memories to which a user has access. We refer to this hardware as Authenticating Disk User Protection Hardware or ADUPHardware. It requires a manual action on the ADUPHardware to change the state of the ADUPHardware corresponding to each user. We refer to the manual action to change the state corresponding to a user on the ADUPHardware as DUPManualAction.

According to the invention, the software, firmware and hardware that implement access restrictions, check the current state of the ADUPHardware and fail each read or write operation which do not meet access restrictions permitted by the current state of the ADUPHardware corresponding to the user on whose behalf the read or write operation is initiated.

Privileged users provide users access to portions of mass memories. The configuration containing access restrictions for each user is written to an area of a mass memory to which only the privileged users have access. This area of the mass memory is protected by the ADUPHardware.

According to the invention, a configuration software allows a user or privileged users to further divide the portions of mass memory or memories to which the user has access and associate each state of the ADUPHardware corresponding to a user with disabling or enabling write or read access to portions of mass memory or memories. Preferably, only a user is allowed to configure access restrictions to portions of mass memory or memories to which that user has been given access by a privileged user or privileged users or the operating system.

The configuration software configures one or more storage components and/or new modules to disable or enable read or write access for a user to portions of a mass memory or memories depending on the state of the ADUPHardware corresponding to a user.

If storage components other than the file systems implement access restrictions, the file systems need to tag a read or write operation with the identifier of the current user of a buffer in the file system buffer cache. Other storage components may not be able identify the user on whose behalf a read or write request is initiated, without this tag. If more than one user is using a buffer in buffer cache in a file system, the accesses by different users need to be serialized so that there is only one user for a buffer at any point of time. Since only one user is associated with a buffer at any time, read or write requests can be tagged with the identifier of that user. The buffer in the buffer cache is written (flushed) to the mass memory (non-volatile storage) if it is dirty (a buffer becomes dirty when a user writes to the buffer), before the buffer is assigned to another user.

If storage components other than the file systems implement access restrictions, the ADUPHardware is not allowed to change the state corresponding to a user until all dirty buffers corresponding to the user are written to mass memory or memories.

The DUPManualAction on an ADUPHardware may be pressing one or more buttons and/or toggling one more switches and/or changing jumper positions etc., on the ADUPHardware.

The DUPManualAction causes the ADUPHardware to authenticate the user who initiated the DUPManualAction.

DETAILED DESCRIPTION OF THE INVENTION

Figure 1:
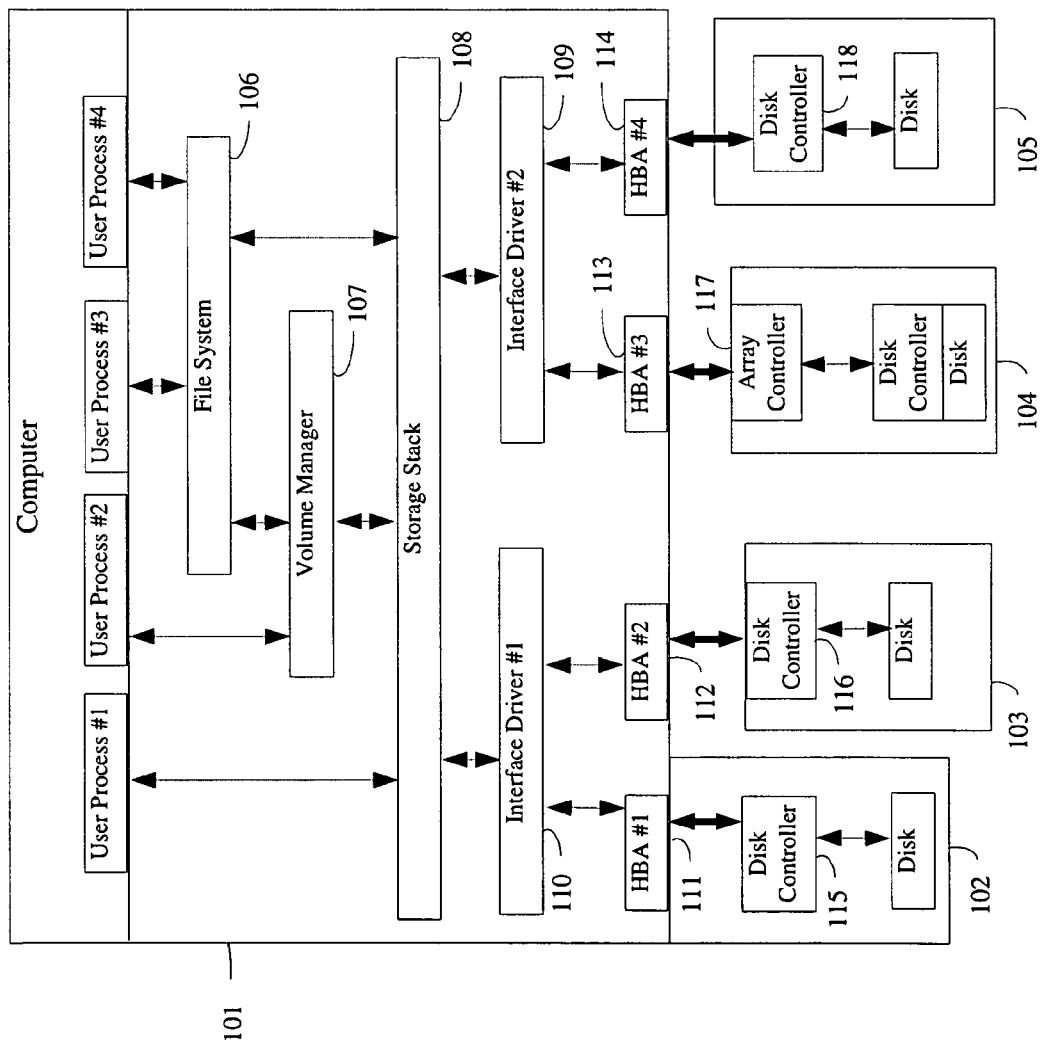
FIG. 1 illustrates different components of the storage system on a computer.
Figure 2:
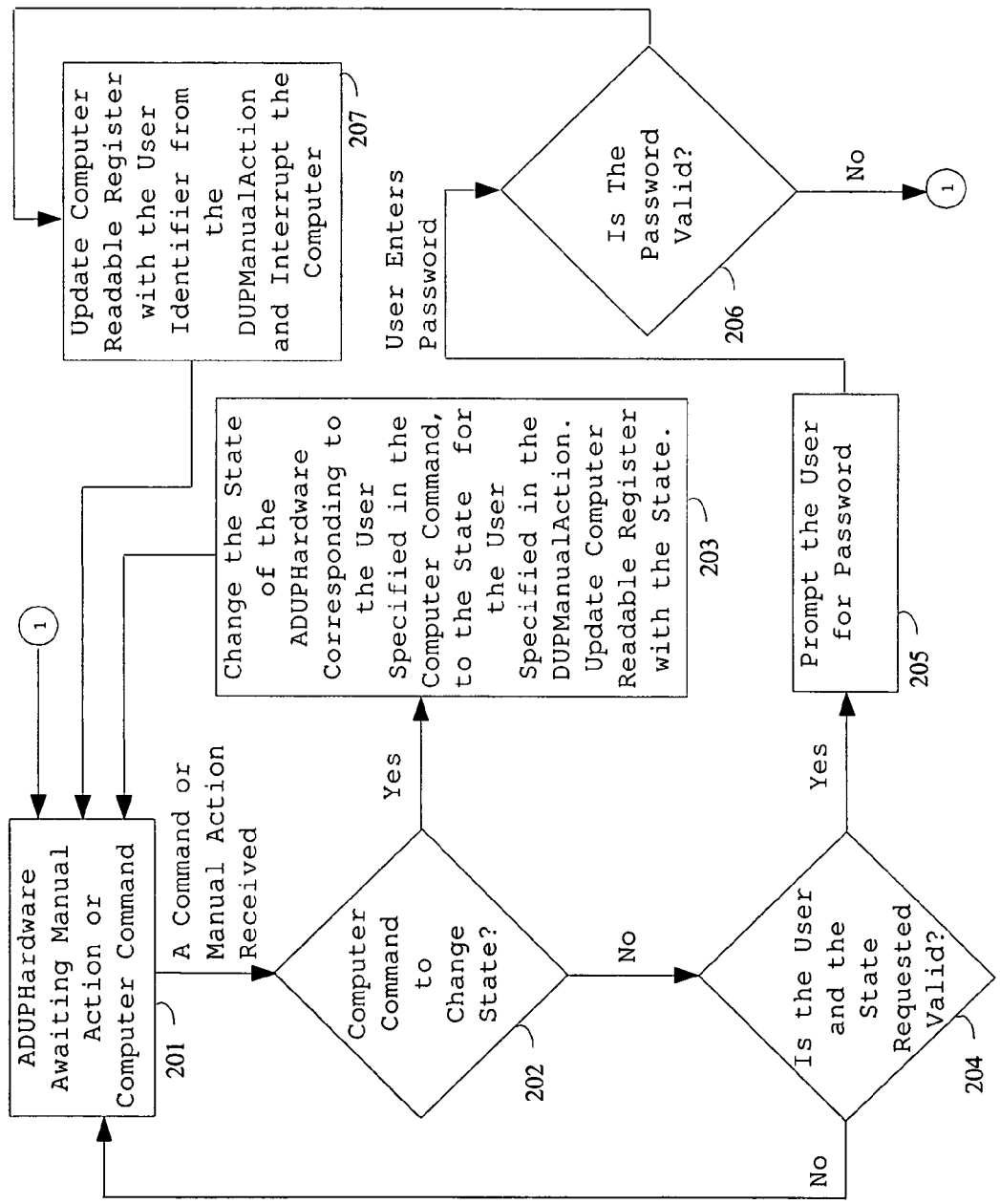
FIG. 2 illustrates an example for states of an ADUPHardware that accepts DUPManualActions and authenticates the users.

FIG. 2 illustrates an example for different states of an ADUPHardware that is attached to a computer and accepts DUPManualActions. The ADUPHardware awaits 201 either a DUPManualAction from a user or a computer command. The ADUPHardware checks 202 the type of input, DUPManualAction or a command from computer. When a DUPManualAction is received, the ADUPHardware checks 204 whether the user and the state requested by the DUPManualAction are valid. If the user or the state is invalid, the DUPManualAction is ignored (discarded). If the user and state are valid, the user is prompted 205 for a password. If the password entered by the user is invalid 206, the ADUPHardware ignores (discards) the DUPManualAction. If the password entered by the user is valid 207, the ADUPHardware updates 207 a register readable by the computer, with the identifier of the user and interrupts 205 the computer using a hardware interrupt, such as PCI interrupt. The computer cannot write into the ADUPHardware register containing the identifier of the user. The ADUPHardware then returns to the state where it waits for a DUPManualAction or a computer command. When ADUPHardware receives a computer command 203 to change the state of the ADUPHardware corresponding to a user, the ADUPHardware changes the state of the user to the state selected through DUPManualAction by the user. Since the state requested by the user is not communicated to the computer, no malicious software can control the state of the ADUPHardware corresponding to a user. The ADUPHardware updates a register readable by the computer 203, with the state corresponding to the user. The computer cannot write into the register containing the state of ADUPHardware corresponding to a user.

Preferably, if more than one DUPManualAction is received for the same user before the state corresponding to the user is changed, the ADUPHardware will change state corresponding to the user to the state corresponding to the last authenticated DUPManualAction made by the user. Optionally, if more than one DUPManualAction is received for the same user before the state corresponding to the user is changed, the ADUPHardware will change the state corresponding to the user to the state corresponding to the first authenticated DUPManualAction made by the user after the last state change for the user. Some implementations may even change the state to one of the states corresponding to an authenticated DUPManualAction between the first manual action after the last state change and the last manual action depending on some other criteria.

The DUPManualAction on an ADUPHardware may be pressing one or more buttons and/or toggling the position of one or more switches and/or turning a wheel and/or changing one or more jumper positions and/or any other DUPManualAction supported by the ADUPHardware.

The ADUPHardware may use registers or memory locations readable by the computer to communicate the identifier of the user who initiated DUPManualAction and the current state of ADUPHardware corresponding to a user. A computer should not be allowed to write into these registers or memory locations. This improves security as a malicious software will not be able to manipulate the state of the hardware corresponding to each user.

An ADUPHardware may control one or more mass memories. There could be one or more ADUPHardwares on a computer, each controlling states corresponding to a mutually exclusive set of users. Some implementations may use more than one ADUPHardware on the same computer, each controlling states corresponding to sets of users which are not mutually exclusive, but we do not recommend such implementations.

There could be different behaviors for the ADUPHardware while accepting passwords. If password entered by a user is invalid, the ADUPHardware could again prompt the user for password and accept a new password from the user until a valid password is received or until the maximum number of password retries is reached or if the user cancels the request to reenter the password. The ADUPHardware that supports retries, will ignore (discard) DUPManualAction only if a valid password is not received even after maximum number of password retries or if the user cancels the password retry. The ADUPHardware may also prompt for a user name in addition to the password. The ADUPHardware may also prompt for a password before the state entered by the user is validated. The method used by an ADUPHardware for authenticating a user using a password is implementation specific.

The ADUPHardware may use other options for validating a user such as finger print validation, retina validation, other current and future technologies for user authentication. The ADUPHardware may also use a combination of two or more of password validation, finger print validation, retina validation, etc., for validating the user. The method used by a ADUPHardware for authenticating a user is implementation specific.

Figure 3:
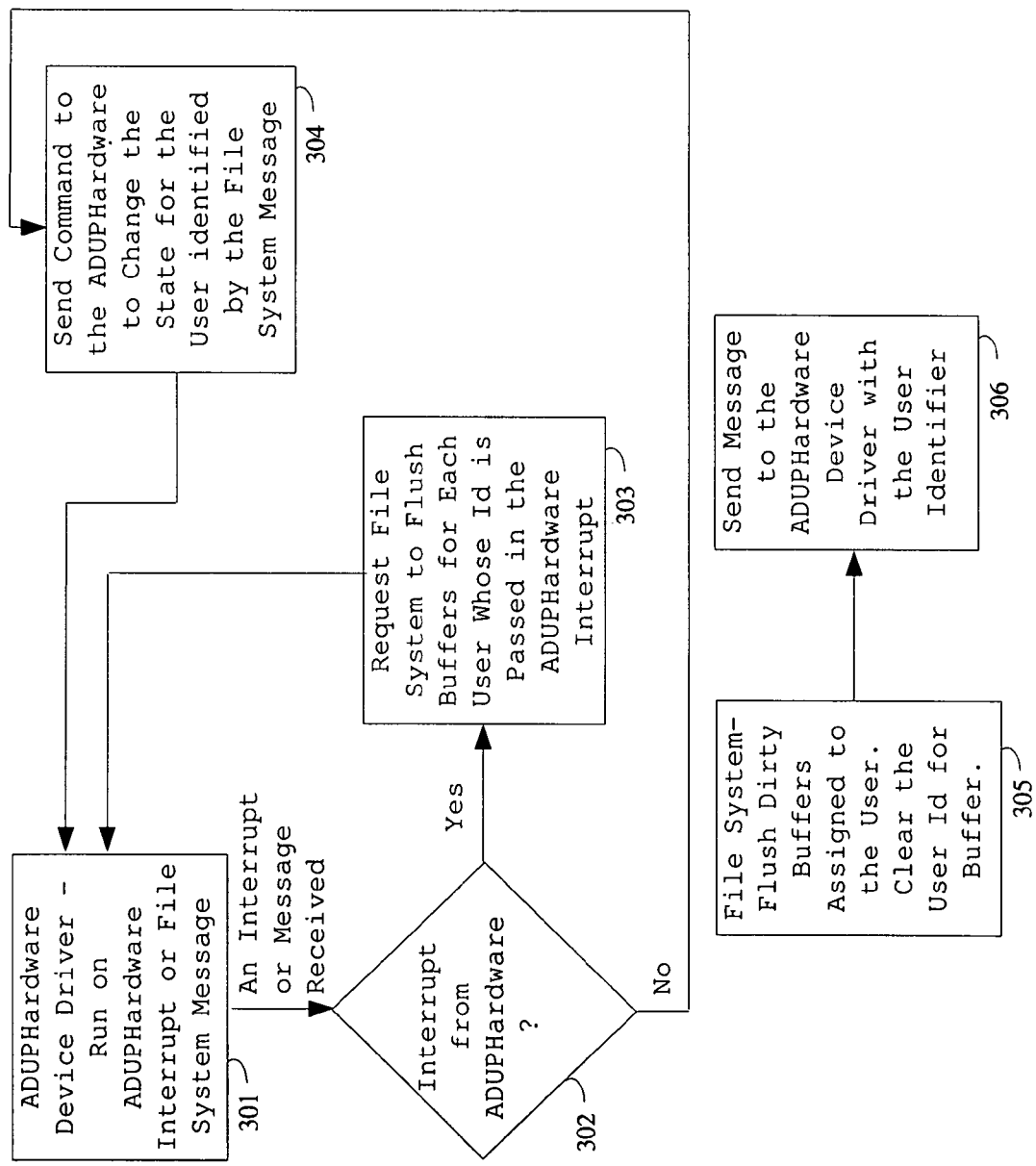
FIG. 3 illustrates an example for states of a device driver that control the ADUPHardware and a file system module which flushes dirty buffers of a user in the file system buffer cache to mass memory and removes association between the user and the buffers in the buffer cache, before sending a message containing the identifier of the user to the ADUPHardware device driver.

FIG. 3 illustrates an example for states of a device driver which runs on a computer and controls the ADUPHardware which accepts DUPManualActions. The ADUPHardware device driver runs 301 either when an interrupt from the ADUPHardware or a message from the file system arrives. The ADUPHardware device driver checks 302 the type of input, an interrupt or a file system message. When an interrupt is received 303, the driver sends a request to the file system to flush dirty buffers belonging to the user/s who identifier/s are present in the computer readable user registers. Only the identifiers of users who performed DUPManualActions will be present in the computer readable user registers of ADUPHardware. A buffer in the file system buffer cache is considered dirty if the user has written into the buffer. The file system flushes (writes to mass memories) 305 the dirty buffers in the file system buffer cache belonging to the user, resets the user identifier in all the buffers that were assigned to the user and then, sends a message 306 containing the user identifier, to the ADUPHardware device driver. The ADUPHardware device driver sends 304 a command to the ADUPHardware to change the state corresponding to the user.

If there are more than one file systems on a computer, the ADUPHardware device driver must send messages containing the identifier of the user to all the file systems on the computer. The ADUPHardware device driver will command ADUPHardware to change the state corresponding to a user only after all the file systems flush dirty buffers assigned to the user and resets the user identifier in all the buffers that were assigned to the user.

The ADUPHardware device driver may use one message for each user to request a file system to flush buffers corresponding to the user.

An ADUPHardware device driver may control one or more ADUPHardware. There could be one or more ADUPHardware device drivers running on a computer each controlling a mutually exclusive set of ADUPHardware.

There could be one or more storage components or new modules that implement access control according to the invention on a computer. We refer to the modules that implement access control according to the invention as DUPImplementers. When an upper layer module sends a new read or write request to the a DUPImplementer, the DUPImplementer will get the current ADUPHardware state corresponding to the user on whose behalf the read or write request was created. The DUPImplementer is configured with information on portions of mass memories and type of access (read or write) allowed or denied for each portion of mass memory, for each combination of user and state. The DUPImplementer checks the portions of mass memory or mass memories accessed by the read or write request against the configuration. If a read or write requests violates the access restrictions, the read or write request is not allowed to proceed and is returned with error. If no configuration is present for a portion of mass memory, DUPImplementers are configured either to allow or to block the read or write request that access such a portion.

Figure 4:
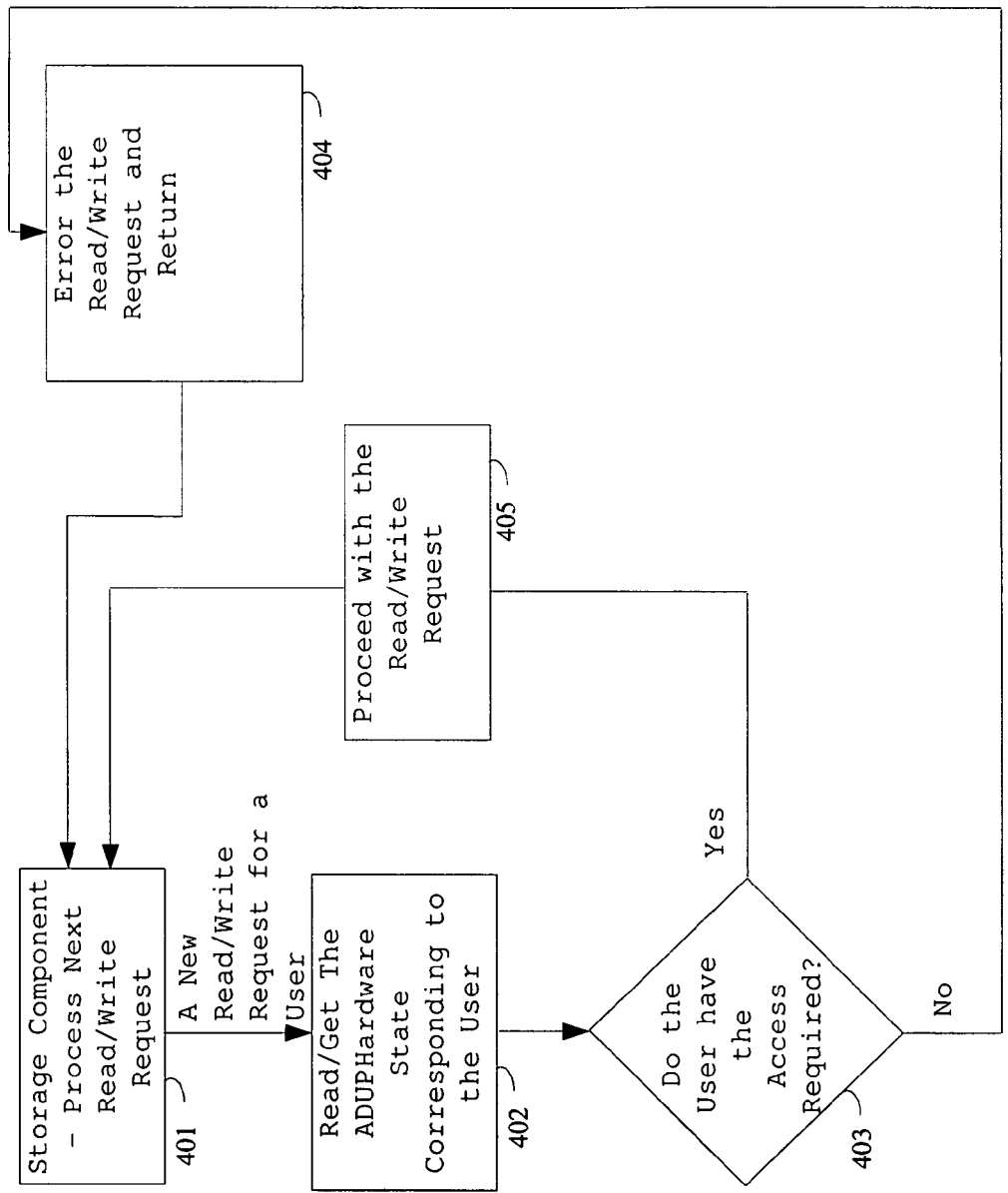
FIG. 4 illustrates an example for states of a module in the storage component that implements access restrictions for each user.

FIG. 4 illustrates an example for a storage component that is a DUPImplementer. The storage component processes read or write requests 401. When a new read or write request arrives, the storage component will read or get the ADUPHardware state 402 corresponding to the user on whose behalf the read or write request was created. The storage component checks 403 whether the read or write request violates access restrictions configured corresponding to the current state of the user. If access is not allowed 404, the read or write request is returned to the upper layer with error. If the access is allowed 405 the read or write request is allowed to proceed.

A user is allowed access to portions of a mass memory or memories by privileged users. The portions of mass memories to which each user has access is not mutually exclusive. The portions of mass memories to which a user has access and the type of access is written to a portion of the mass memory to which only privileged users has access. The area of the mass memory where this configuration is stored is protected by the ADUPHardware.

A configuration software allows each user to further divide these portions of mass memory or mass memories to which the user has access. The configuration software further allows a user to enable or disable read or write access to each of these divided portions and associate the access restrictions to a state of the ADUPHardware corresponding to the user. Preferably, the access restrictions associated with each state is independent of access restrictions associated with other states of the ADUPHardware corresponding to the same user. Optionally, access restrictions are such that there are dependencies between access restrictions corresponding to some or all of the states corresponding to a user.

Preferably, the configuration corresponding to a user is written to a predefined area of the mass memory or mass memories, selected on the basis of the user identifier and write to this area is enabled for the user only on one or more states of ADUPHardware corresponding to the user. Preferably, no other user, including privileged users has write or read access to this area of the mass memory or mass memories.

Figure 5:
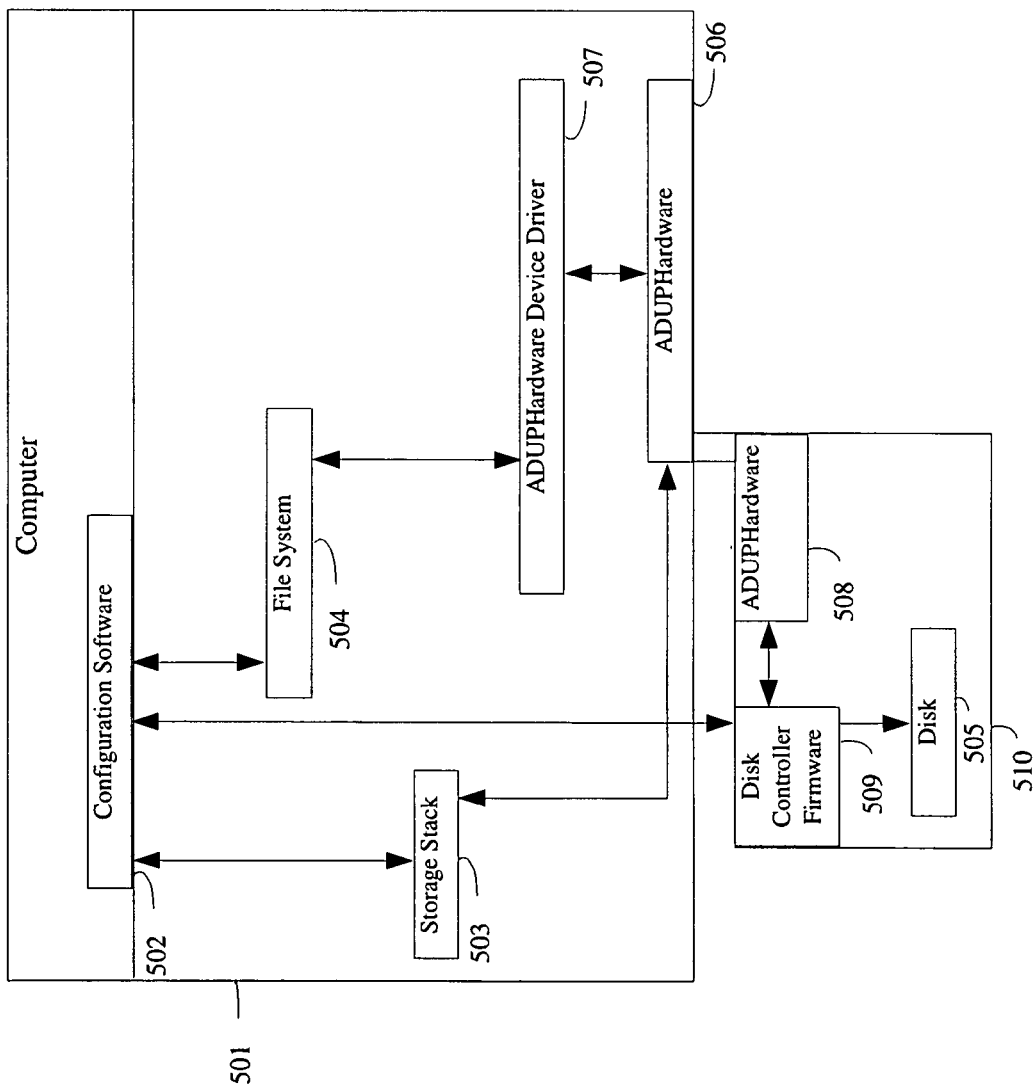
FIG. 5 illustrates an example of how different components interact when used with an ADUPHardware that accepts DUPManualActions and authenticates users.

FIG. 5 illustrates an example of interaction between different components in a computer 501 that implement read and write protection for each user to parts of a mass memory, using an ADUPHardware 506 508 that accepts DUPManualActions. Only components that are changed or affected by the invention are shown. The ADUPHardware 506 writes the identifier of the user in a memory location readable by the computer and interrupts the computer after a user performs DUPManualAction to change the state corresponding to the user and the user is authenticated. The ADUPHardware device driver 507 processes the interrupt and reads the identifier of the user from the ADUPHardware. The ADUPHardware device driver will send a request to the file system 504 to flush dirty buffers assigned to the user. The file system 504 goes through the list of buffers assigned to the user, writes (flushes) dirty buffers that were assigned to the user to the mass memory and removes the association between the user and the buffer. After removing the association between the user and all the buffers that were assigned to the user, the file system 504 sends a message to the ADUPHardware device driver 507. The ADUPHardware device driver sends a command to the ADUPHardware to change it's state corresponding to the user. Part of the ADUPHardware 508 is enclosed in the disk enclosure 510. In this example, the configuration software 502 configures the file system 504, the storage stack 503 and disk controller firmware 509 to implement access restrictions for users. The storage stack gets the state of the ADUPHardware corresponding to a user by reading the computer readable memory in the ADUPHardware containing states. The file system gets the state of ADUPHardware corresponding to a user through the ADUPHardware device driver, which reads the computer readable memory in the ADUPHardware containing states. The disk controller firmware 509 gets the state of the ADUPHardware by reading a memory in the ADUPHardware 506 508 containing the current state for each user using an interface within the disk enclosure. The state of the ADUPHardware corresponding to a user is used by the storage stack, the disk controller firmware and the file system to implement access restrictions for the user configured using the configuration software. The configuration software interacts with the storage stack to write the configuration to the disk 505. The configuration is read by the storage stack, the disk controller firmware, the file system and the configuration software. The file system and the configuration software interact with the storage stack to read the configuration from the disk 505. The components which are not affected by the invention such as Interface Driver, HBA, Disk Controller, etc., are not shown.

The protection provided by ADUPHardware need not be limited to mass memories alone. Other modules that implement access protections could check the current state of the ADUPHardware corresponding to a user and implement access restrictions based on the current state and configuration associated with that state for the modules.

Since ADUPHardware or part of ADUPHardware can be enclosed in the same mass memory that is being protected, there is less risk to data even if the laptop of a user is stolen.

The authentication is done by ADUPHardware and a malicious software will not be able to manipulate the authentication process.

What is claimed is:

1. An apparatus implemented in hardware which is used for implementing access protection for users of a computer, the said apparatus comprising:
    (a) a mechanism to support one or more users;
    (b) a mechanism to support two or more states for each supported user;
    (c) a user authentication mechanism for user authentication;
    (d) a mechanism to accept manual action from a user to change the state of the said apparatus corresponding to the said user, wherein the said manual action can be: pressing one or more buttons and/or toggling the position of one or more switches and/or turning a wheel and/or changing one or more jumper positions and/or any other manual action accepted by the said apparatus;
    (e) a mechanism which allows a device driver of the said apparatus executing in the said computer to read registers or memory locations of the said apparatus to get the identifier of a user who has performed a manual action to change the state of the said user and has been authenticated;
    (f) a mechanism to accept a command from a device driver of the said apparatus to change the state of the said apparatus corresponding to a user; and
    (g) a mechanism for changing the state corresponding to the said user to the state requested by the said user by performing manual action.

2. The apparatus of claim 1 further comprising: a mechanism which allows a device driver of the said apparatus in the said computer or, in the case where a disk/array controller is coupled to the apparatus, a disk/array controller firmware or, both the said device driver and the said firmware to read the current state of a user from registers or memory in the said apparatus.

3. The apparatus of claim 2 further comprising:
    a user write protection mechanism which prevents a computer from writing to the registers or memory locations containing the identifier of a user who has performed a manual action on the said apparatus to change the user state and has been authenticated, wherein the said user write protection mechanism further improves security by preventing software from manipulating the user identifier; and/or
    a state write protection mechanism which prevents a computer from writing to the registers or memory locations containing the current state of users, wherein the said state write protection mechanism further improves security by preventing software from manipulating user states.

4. The apparatus of claim 3 further comprising: a mechanism which allows each user of the said apparatus to configure the said user authentication mechanism with the data for authenticating himself or herself.

5. The apparatus of claim 4 further comprising a mechanism:
    (a) to present itself as an input/output device to a computer; or
    (b) to couple itself directly or indirectly to the mother board of a computer and to present itself as an input/output device to a computer; or
    (c) to present itself as a memory to a computer.

6. The apparatus of claim 5 further comprising: an interrupt mechanism to interrupt the computer which the said apparatus is part of or is attached to.

7. The apparatus of claim 6 further comprising: a coupling mechanism to couple itself to an array or disk controller.

8. The apparatus of claim 7 further comprising: a firmware interrupt mechanism to create an interrupt detectable by the firmware running on the said array or disk controller.

9. The apparatus of claim 7 or part of the said apparatus being enclosed in the same enclosure as the mass memory or mass memories which is/are being write or read protected by the said apparatus.

10. One or more apparatuses of claim 1 being used with a computer to control access for the users of the said computer, wherein each of the said apparatuses on the said computer controls states of a mutually exclusive set of users of the said computer.

11. The apparatus of claim 6 changing the state of the said apparatus corresponding to a user by the said user performing a manual action, the said changing of the state comprising:
    (a) the said apparatus authenticating the said user who performed the said manual action and rejecting the said state change requested by the said user by performing the said manual action if the authentication fails;
    (b) the said apparatus generating an interrupt to the computer to which it is attached after updating a register or memory location readable by the said computer with the identifier of the said user who has performed the said manual action if the said user authentication for the said manual action is successful;

(c) the device driver of the said apparatus reading the said user identifier; and sending a message to the file systems in the said computer to perform cleanup for the said user who has performed the said manual action;

(d) the said file systems:

writing dirty buffers in the buffer cache which were assigned to the said user, to the mass memory or mass memories, wherein the said dirty buffers are buffers into which the said user has written;

removing association between the said user and all the buffers in the buffer cache that were assigned to the said user; and sending a message to the said device driver of the said apparatus;

(e) the device driver of the said apparatus sending a command to the said apparatus to change the state of the said apparatus corresponding to the said user to the state requested by the said user by performing the said manual action; and (f) the said apparatus updating a computer readable register or memory location with the new state of the said apparatus corresponding to the said user.

12. The apparatus of claim 11 changing the state of the said apparatus corresponding to a user by the said user performing a manual action, optimizing the said changing of the state by: removing the steps of writing of dirty buffers.

13. The apparatus of claim 11 changing the state of the said apparatus corresponding to a user by the said user performing a manual action, optimizing the said changing of the state by: removing one or more steps of claim 10 after the said user performs a manual action on the said apparatus to change his or her state and authentication of the said user is completed.

14. The apparatus of claim 1 changing the state of the said apparatus corresponding to a user by the said user performing a manual action, the said changing of the state comprising: the apparatus changing state as soon as the said user performs a valid manual action on the said apparatus to change his or her state and the said user is authenticated.

15. The apparatus of claim 6 communicating the state of the said apparatus corresponding to a user to the device driver of the said apparatus:

either when said device driver of the said apparatus polls the said apparatus;

or when said device driver of the said apparatus reads the user state from registers or memory locations in the said apparatus when the said apparatus creates an interrupt detectable by the computer on which the said device driver is executing.

16. The apparatus of claim 8 communicating the state of the said apparatus corresponding to a user to a disk/array controller firmware in a disk/array controller coupled to the said apparatus:

either when said firmware polls the said apparatus;

or when said firmware reads the user state from registers or memory locations in the said apparatus when the said apparatus creates an interrupt detectable by the said disk/array controller.

17. The apparatus of claim 2 communicating the state of the said apparatus corresponding to a user to a module which implements access protection in a computer when the said module polls the said apparatus.

18. A method of implementing access protection to the regions of a mass memory or mass memories by one or more modules implemented in hardware based on the current state of the users of a computer, said method comprising:

a) associating one or more states of a user of the said computer with disabling or enabling write and/or read access to regions of one or more mass memories for the said user by:

i) dividing the regions of mass memories to which the said user has access;

ii) configuring access control to mass memories by enabling or disabling read and/or write access for the said divided regions of one or more mass memories for the said user; and iii) associating the said access controls to one or more states of the said user;

b) configuring modules which implement access protection to disable or enable read and/or write access for the said user to regions of mass memory or mass memories depending on the state of the said user;

c) the said configuring of modules further comprising configuring parameters, wherein the said parameters are configured in the said modules only if the said modules recognize the said parameters, wherein the parameters can be: directories, files, physical blocks, logical blocks, disk sectors, a combination of head, cylinder and sector, or any other parameter that can be mapped to regions of a mass memory or mass memories;

d) the said modules which implement access protection allowing or failing read and/or write requests from the said user based on the current state of the said user and on the configuration; and (e) wherein the user configuration contains the association between access controls and user states, and writing the configuration corresponding to each user to a predefined region of the mass memory or mass memories selected on the basis of the user identifier; and write protecting the region of mass memory or mass memories containing the configuration corresponding to each user according to the current state of each user of a computer.

19. A method of claim 18, wherein said configuring of access controls further comprising:

(a) either disabling all access for a user by default to regions of mass memory to which the said user is granted read and/or write access; and enabling the read and/or write access to a region of mass memory only when the current state of the said user is configured to allow the said read and/or write access to the said region;

(b) or enabling all access for a user by default to regions of mass memory to which the user is granted access; and disabling the read and/or write access to a region of mass memory only when the current state of the said user is configured to prevent the said read/or write access to the said region.

20. A method of claim 18, wherein said configuring of access controls further comprising: configuring all modules in a computer which implement access protection according to claim 18 to either block or allow read/write requests from a user to those regions of mass memory or mass memories for which there is no configuration corresponding to the current state of the said user.

21. A method of claim 18, wherein said configuring of access controls further comprising:

(a) either configuring the access controls in such a way that the access restrictions associated with each state corresponding to a user are independent of access restrictions associated with other states corresponding to the said user;

(b) or configuring the access controls in such a way that the access restrictions associated with each state corresponding to a user are dependent on access restrictions associated with one or more states corresponding to the said user.

22. A method of claim 18, wherein said configuring of access controls further comprising: configuring access controls in such a way that the regions of mass memory or mass memories to which access restrictions are configured corresponding to a state of a user, need not be mutually exclusive to regions of mass memory or memories to which access restrictions are configured corresponding to another state of the said user.

23. A method of claim 18, wherein said configuring of access controls further comprising: configuring access controls in such a way that the regions of mass memory or mass memories to which access restrictions are configured corresponding to a state of a user, need not be mutually exclusive to regions of mass memory or memories to which access restrictions are configured corresponding to a state of a different user.

24. A method of claim 18, wherein said configuring of modules uses a configuration software containing a mechanism to show to users the mapping from files/directories to regions of mass memory or mass memories, wherein the mapping from a directory to the regions of mass memory or mass memories can include the regions of mass memory or mass memories used by subdirectories and all files in the said directory and the said subdirectories.

25. A method according to claim 18 being used for protecting access to the configuration, wherein the said configuration contains regions of mass memories to which each user has access and the type of access, said method comprising:
    writing the said configuration to a region of mass memory or mass memories to which only privileged users have access, wherein a privileged user is a user who can configure privileges for other users; and
    protecting the said region of mass memory or memories according to the current state of each user of a computer.

26. A method comprising: only a user being given permission to configure access controls of claim 18 for the said user within the region of mass memory or mass memories to which the said user has access.

27. A method according to claim 18 for implementing access protection by an array or disk controller, said method further comprising: not failing a read or write request if the said read or write request is permitted for any of the users and the user who initiated the said read or write request cannot be identified.

28. A method for associating a user identifier with a read or write request to read from or write to one or more mass memories, wherein the said user identifier in the said association is used for implementing access protection, said method comprising:
    (a) either the operating system tagging each raw disk read or write request with the said user identifier of the user issuing the said raw disk read or write request;
    (b) or by file systems tagging the said read or write requests with the identifier of the current user of the buffer in the file system buffer cache by:
        (i) serializing the accesses by different users to each buffer in the buffer cache; and
        (ii) writing a dirty buffer in the buffer cache to the mass memory before the buffer is assigned to another user if modules other than file systems implement access protection using the said tag, wherein a dirty buffer is a buffer into which the current user has written.

29. A method comprising: tagging read or write commands to read from or write to mass memories with a user identifier of claim 28 or a value derived from it, wherein said user identifier or the value derived from it in the said tag is used for implementing access protection.

30. A method according to claim 29 comprising: tagging read or write commands to Fibre Channel mass memory using the OX_ID field in a Fibre Channel read or write command with the said user identifier or a value derived from it.

* * * * *